July 14, 1964      K. J. WILLIS      3,140,614
LOW FRICTION PIVOTAL MOVEMENT FOR TRANSDUCERS
Filed Jan. 11, 1961      3 Sheets-Sheet 1
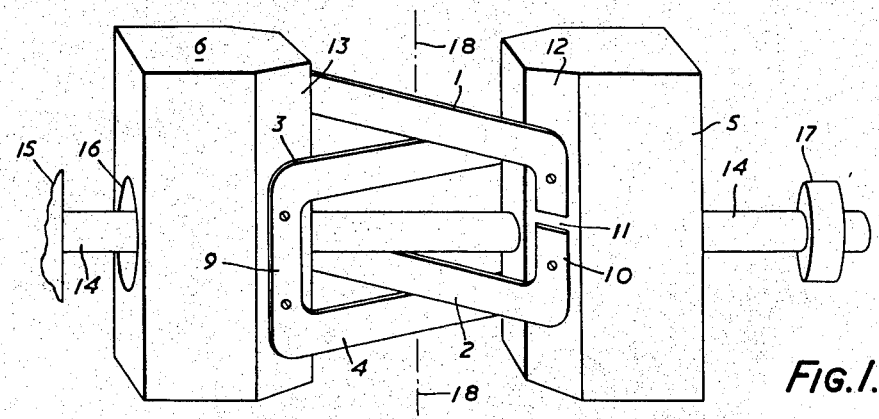
FIG. 1.
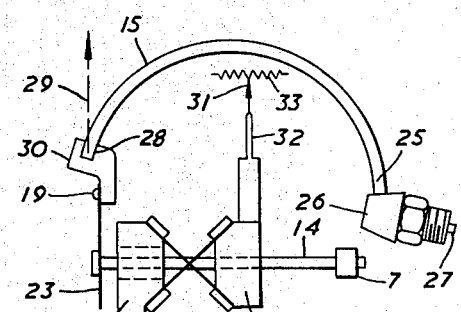
FIG. 2.
FIG. 3.
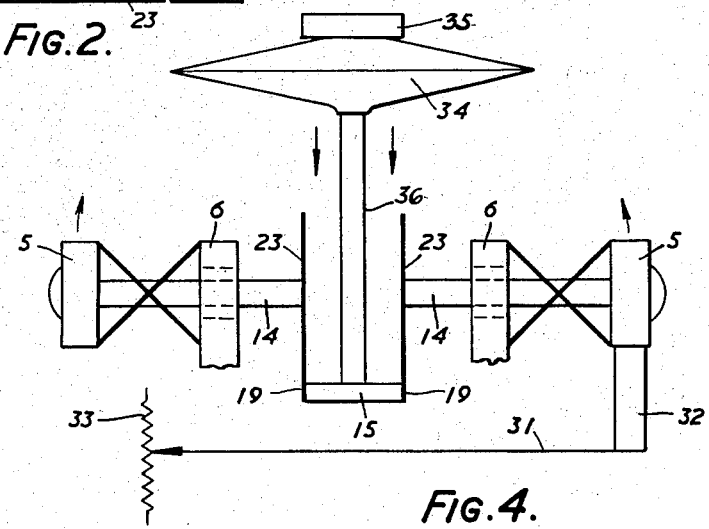
FIG. 4.
INVENTOR
Kenneth James Willis
BY
Pierce, Scheffler & Parker
ATTORNEYS

United States Patent Office 3,140,614
Patented July 14, 1964

3,140,614
LOW FRICTION PIVOTAL MOVEMENT
FOR TRANSDUCERS
Kenneth James Willis, Pinner, England, assignor to
J. Langham Thompson Limited
Filed Jan. 11, 1961, Ser. No. 82,000
Claims priority, application Great Britain Jan. 13, 1960
8 Claims. (Cl. 73—410)

The present invention relates to mechanical systems, and pivot arrangements for use therein. More particularly, the invention relates to pivot arrangements designed for use in mechanisms subject to vibration or similar environmental disturbance, and in which it is important that friction at the pivot should be kept to a minimum. One mechanism of this kind is a pressure transducer for aircraft.

In accordance with the present invention, there is provided a transducer system comprising in combination a fixed member having an aperture therethrough, a movable member mounted on said fixed member for pivotal movement with respect thereto, two spaced pairs of flexible members providing pivotal connections between said fixed and movable members, each pair of flexible members being crossed, a coupling member rigidly attached to said movable member and passing symmetrically between said two spaced pairs of flexible members and through said aperture of said fixed member to a point on the side of the pivot axis remote from the movable member, and a force-transmitting member connected to said coupling member at an extended part thereof.

Other features and advantages of the invention will be apparent from the following description, given by way of example only, of an embodiment thereof, reference being made to the accompanying drawings in which:

FIGURE 1 is a perspective view of the pivot arrangement,

FIGURE 2 is a plan of a link spring for use with the arrangement,

Figure 5:
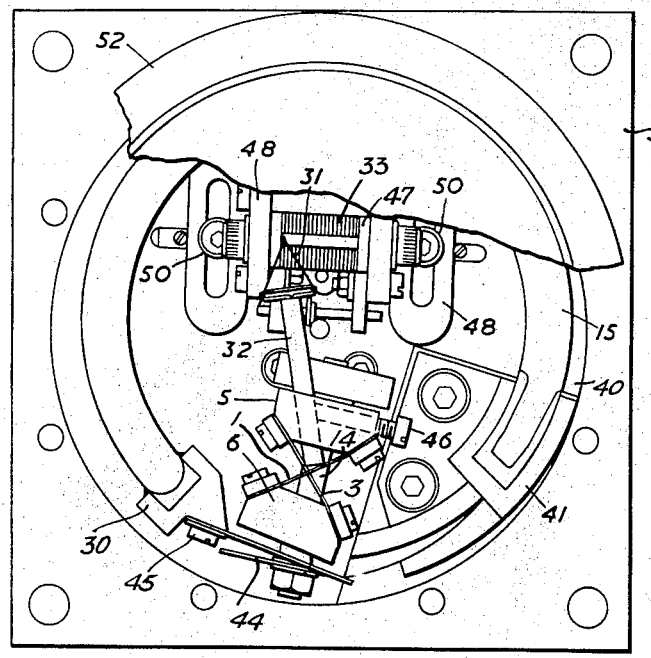
Figure 6:
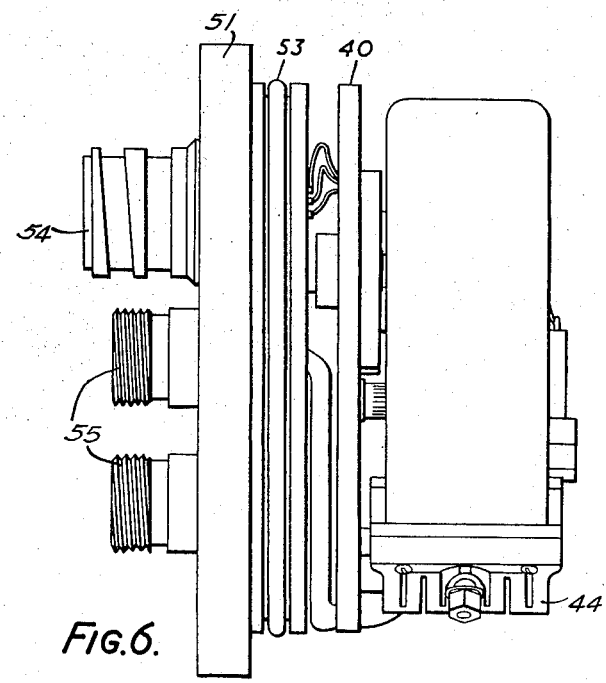
Figure 7:
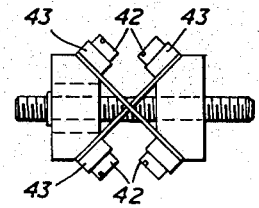
Figure 8:
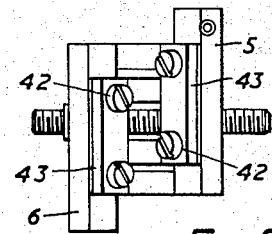
Figure 9:
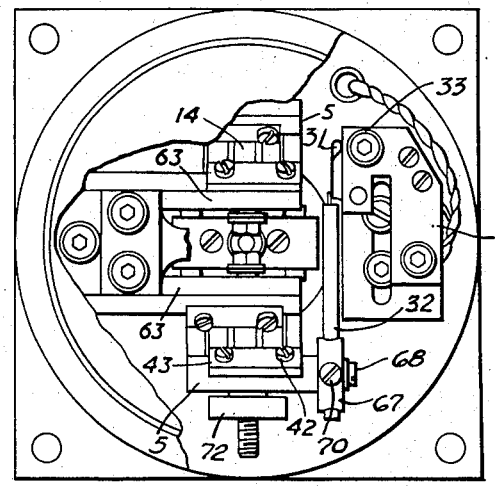
Figure 10:
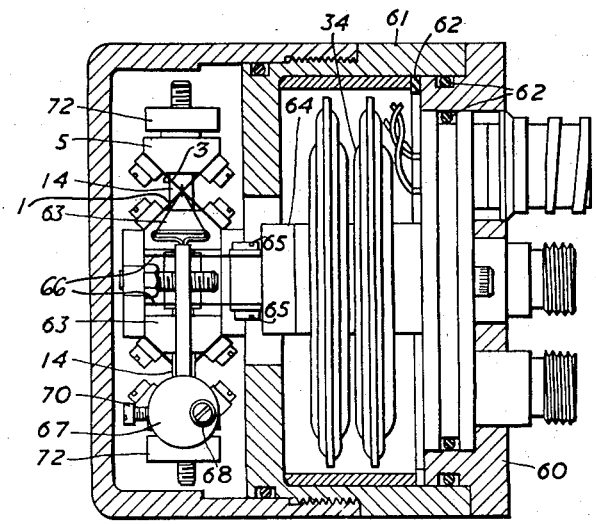

FIGURE 3 is a schematic diagram of a Bourdon-type pressure transducer embodying the invention, FIGURE 4 is a similar diagram of a capsule-type pressure transducer, FIGURE 5 is a front elevation of a Bourdon tube type pressure gauge, incorporating a resistance type transducer element, with the cover partly broken away, FIGURE 6 is a side elevation of the gauge of FIGURE 5, with the cover removed, FIGURE 7 is a detail plan showing the pivot members, FIGURE 8 is a detail elevation showing the pivot members of FIGURE 7, FIGURE 9 is a front elevational view of an aneroid, capsule-type pressure gauge, and FIGURE 10 is a part-sectional view of the gauge of FIGURE 9.

Referring now to FIGURE 1, the pivot arrangement includes two pairs 1, 2 and 3, 4 of crossed spring strips fixed rigidly at their ends to clamping blocks 5, 6. In the example shown, each pair of strips forms part of a rectangle having short sides 9, 10 and a cut 11 in the side 10 of one rectangle allows the strips to be placed so that strips 1 and 3 are adjacent and spaced from strips 2 and 4; the sides 9, 10 are fixed to chamfered edges 12, 13 of the blocks 5, 6.

A lever arm 14 secured to a displaceable member indicated at 15 passes through a clearance opening 16 in the block 6 and is attached to block 5, which is provided with a counterweight conveniently formed by an extension of the arm 14 on the other side of the block 5, and a counterbalance weight 17 secured to the extension. This arrangement of the springs 1–4 attached to damping blocks 5 and 6 forms a cross-spring pivot whose axis is indicated at 18. The pivot is virtually frictionless, but has a restoring force or stiffness such that the torque/angular rotation characteristic of the movement is linear over small deflections. The mass of the displaceable member 15 is arranged to be counterbalanced by the mass of block 5 and weight 17, these inertia masses being on opposite sides of the axis 18. If block 6 is fixed and member 15 is moved about the axis 18, the angular deflection produced in the pivot arrangement is then substantially unaffected by forces due for example to acceleration or vibration, which in the absence of the counterbalancing system would tend to distort the pivot by the formation of couples having axes not coinciding with the axis 18.

If the displacement of the member 15 does not occur at constant radius about the axis 18, a link is required between the lever arm 14 and the member 15. In order to avoid unnecessary friction a link spring such as that shown in FIGURE 2 may be used. This spring is in the shape of a continuous strip having a cross-piece 19 with attachment holes 20, side-pieces 21, re-entrant strips 22 and a short end strip 23 with an attachment hole 24. The spring, which is planar in its unstressed state, can be deformed out of its natural plane by movement of members attached to cross-piece 19 and end strip 23 and thus acts as a link pivoted at both ends.

The pivot arrangement of FIGURE 1 and the link spring of FIGURE 2 are embodied in the pressure transducer mechanisms, shown diagrammatically in FIGURES 3 and 4, similar parts being given identical reference numerals. Referring first to FIGURE 3, the displaceable member 15 is in this case a Bourdon tube one of whose ends 25 is connected through a fixed block 26 to a pressure inlet 27. The other end 28 of the Bourdon tube, which is closed, moves in response to the pressure in the tube along a path 29 which approximates to a straight line but is in fact slightly curved. End 28 is connected through a shoe 30 to cross-piece 19 of the link spring shown in FIGURE 2, end strip 23 of which is joined to lever arm 14 of the pivot arrangement of FIGURE 1. Movement of block 5 in response to changes of pressure causes wiper 31 on block extension 32 to move along a potentiometer resistance winding 33.

Conventional Bourdon pressure gauges employ three bearings or pivots in order to translate the movement of the end of the Bourdon tube into motion of an indicator arm or potentiometer wiper. This makes them very susceptible to vibration, and the friction in the bearings, being of constant value irrespective of the pressure applied to the tube, gives a hysteresis effect. This effect is minimized in the pressure gauge shown in FIGURE 3, where stiffness is proportional to deflection, and the gauge is much more reliable since it is virtually unaffected by vibration.

The capsule-type pressure transducer shown in FIGURE 4 operates in a similar manner. The pellet 34, fixed at 35, moves rod 36 in response to changes in pressure. Displaceable member 15 is fixed to the end of rod 36 and, in order to keep the system symmetrical, with rod 36 moving always in a direction perpendicular to the pellet 34, two link springs and pivot arrangements are disposed opposite each other on either side of the rod. Wiper 31 on extension 32 of one of the blocks 5 moves over a potentiometer 33 as in the pressure transducer of FIGURE 3.

A practical form of the pressure transducer shown in FIGURE 3 is shown in FIGURES 5 to 8 inclusive; like parts in the drawings bear like reference numerals.

The gauge comprises a base plate 40, to which one end of the Bourdon tube is anchored at 41. The fixed block 6 is also attached to plate 40; the moving block 5 is pivoted to it by the spring arms 1 to 4. The arms are clamped to the respective blocks by screws 42 and clamping plates 43; and, as is shown more clearly in FIGURE 8, block 5 is disposed slightly above block 6. Rod 14 is attached near one end to block 5 and passes through a clearance opening in block 6; at its other end it is attached to the centre part of spring 44, which is the same as part 23 shown in FIGURE 2. The spring is in turn secured by screws 45 to the driving member 30 fastened to the end of Bourdon tube 15.

A wiper 31 is carried by arm 32 on block 5; arm 32 passes through an opening in block 5 and is held by a locking screw 46. The wiper is made of a thin hard wire of V form, the tip of which bears against resistance 33. Resistance 33 is of wire wound helically on a ceramic form 47, supported in brackets 48. The resistance assembly is held to plate 40 by screws 50, and can be readily removed for replacement or repair.

Plate 40 is secured to a mounting plate 51, and the mechanism can be sealed by a cover 52. Cover 52 is sealed to plate 51 by an O ring 53. Electrical connections are made to the effective ends of the resistance 33 and wiper 31 by a socket contact 54 and pressure connections 55, three in number, to the tube, the casing and a purge connection.

A practical form of the arrangement shown in FIGURE 4, and using an aneroid capsule, is shown in FIGURES 9 and 10. Like parts in these drawings bear like reference numerals.

In these figures, capsule 34 is secured to a circular mounting plate 60, to which in turn is secured a cylindrical housing 61. Sealing O-rings 62 are provided as indicated. The transducing assembly is mounted on the end face of housing 61.

In the arrangement of FIGURES 9 and 10, the two fixed blocks 6 are formed integrally as a U-shaped member, indicated at 63; the cross springs are similar to those shown in FIGURE 8 and are attached to the fixed block 63 and the two moving blocks 5.

At the end of capsule 34 is a coupling member 64 to which are attached, by screws 65, the coupling springs 66. The other ends of these springs are fastened to the rods 14, secured to the outer moving blocks 5. When the capsule 34 expands under pressure, the rods 14 and with them the blocks 5 will pivot about the axes defined by the pairs of crossed arms 1 to 4.

The lower of the two blocks 5 shown in FIGURE 9 carries arm 32 at the end of which is wiper 31 engaging the resistance element 33. The arm is mounted on the block by means of a small disc 67 screwed to the block 5 by screw 68, the arm being held in an opening in the block by locking screw 70. The resistance element 33 is carried in a removable assembly including brackets 71. Counterweights 72 are provided on rods 14.

It will be seen that the constructions described afford transducers that are free of pivot backlash, and can be dynamically balanced so that they will be largely insensitive to acceleration.

What I claim is:

1. A transducer system comprising in combination a fixed member having an aperture therethrough, a movable member mounted on said fixed member for pivotal movement with respect thereto, two spaced pairs of flexible members providing pivotal connections between said fixed and movable members, each pair of flexible members being crossed, a coupling member rigidly attached to said movable member and passing symmetrically between said two spaced pairs of flexible members and through said aperture of said fixed member to a point on the side of the pivot axis remote from the movable member, and a force-transmitting member connected to said coupling member at an extended part thereof.

2. A transducer system according to claim 1, wherein said force-transmitting member is flexible and wherein a displacement sensing means is connected to said movable member.

3. A transducer according to claim 2, and including a Bourdon tube connected to said force-transmitting member, said displacement sensing means detecting movement of said Bourdon tube.

4. A transducer according to claim 2, and including an aneroid capsule connected to said force-transmitting member, said displacement sensing means detecting movement of said aneroid capsule.

5. A transducer system comprising in combination a pair of fixed members each having an aperture therethrough, a movable member mounted on each said fixed member for pivotal movement with respect thereto, two spaced pairs of flexible members providing pivotal connections between each said fixed member and its corresponding movable member, each pair of flexible members being crossed, a coupling member rigidly attached to each movable member and passing symmetrically between said two spaced pairs of flexible members and through said aperture of the corresponding fixed member to a point on the side of the pivot axis remote from the said movable member, and a force-transmitting member connecting a common force-transmitting element to each said coupling member at an extended part thereof.

6. A transducer according to claim 5, wherein each said force-transmitting member is flexible and wherein a displacement sensing means is connected to said movable member.

7. A transducer according to claim 6, and including a Bourdon tube connected to said force-transmitting member, said displacement sensing means detecting movement of said Bourdon tube.

8. A transducer according to claim 6, and including an aneroid capsule connected to said force-transmitting member, said displacement sensing means detecting movement of said aneroid capsule.

References Cited in the file of this patent

UNITED STATES PATENTS

| | | |
|---|---|---|
| 1,988,527 | Truman | Jan. 22, 1935 |
| 2,530,068 | McCabe | Nov. 14, 1950 |
| 2,611,659 | Hadley | Sept. 23, 1952 |
| 2,793,028 | Wheeler | May 21, 1957 |
| 2,931,994 | Gibbs | Apr. 5, 1960 |
| 2,973,496 | Gibbs | Feb. 28, 1961 |